Nov. 1, 1966 J. K. HULM ETAL 3,283,277

SUPERCONDUCTING SOLENOID FORMED FROM A NIOBIUM-BASE ALLOY OF VARYING COMPOSITION

Filed Nov. 21, 1963

INVENTORS.
JOHN K. HULM
HENRY RIEMERSMA

BY H M. Snyder

ATTORNEY

United States Patent Office 3,283,277
Patented Nov. 1, 1966

3,283,277

SUPERCONDUCTING SOLENOID FORMED FROM A NIOBIUM-BASE ALLOY OF VARYING COMPOSITION

John K. Hulm, Pittsburgh, and Henry Riemersma, Penn Hills Township, Pa., assignors to Westinghouse Electric Corporation, Pittsburgh, Pa., a corporation of Pennsylvania Filed Nov. 21, 1963, Ser. No. 325,367
8 Claims. (Cl. 335—216)

This invention relates to coils and in particular it concerns coils useful as solenoids in cryogenic applications.

Under superconducting operation of a solenoid, the condition must be satisfied that each element of wire therein carries a current which is less than the critical current at the magnetic field intensity in which the wire exists. Indeed, any element in a solenoid which does not meet this condition will cause an appreciable non-superconducting region to develop within the solenoid. Considering a given solenoid of fixed volume of wire, the foregoing limiting condition has been one of those which have, heretofore, effectively prevented the attainment of wholly satisfactory utilization of high magnetic field materials in solenoids in cryogenic applications.

It is a primary object of the present invention to provide solenoids for use in cryogenic applications in which there is attained substantially better magnetic fields for a given length of a specified superconductor wire than heretofore has been experienced.

It is another object of the invention to provide a solenoid for use in cryogenic applications in which selective groups of layers of turns of wire are composed of zirconium-niobium alloy compositions of decreasing zirconium content as the groups are of increasing radial distance from the axis of the solenoid.

Other objects of the invention will be apparent from the following detailed description and discussion and the drawing in which.

Figure 2:
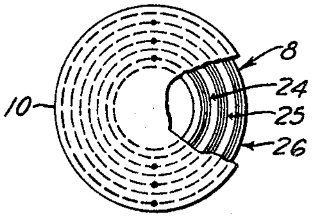
FIG. 2 is an end view of the solenoid of FIG. 1 with part of one end member broken away.

The superconducting properties of some superconducting alloy systems are composition dependent. By way of example, in the niobium-zirconium alloy system, as the zirconium content of the alloy increases, the critical current density decreases, except when approaching the critical magnetic field value. In the present invention, advantage is taken of this characteristic of a superconductive alloy or compound system. For example, with the niobium-zirconium alloy system, a solenoid is formed in this invention with the highest critical field, low current density wire used only for the central section along the axis of the solenoid. The intermediate section, where the field is less than the critical field for niobium-zirconium wire of a lower zirconium content than the first-mentioned wire, is formed of such a lower zirconium content niobium-zirconium wire; and finally, a wire of still lower zirconium content is used for the outermost portion of the solenoid. Thus, higher currents can be used in the intermediate and outer sections appropriate to their analyses, and thereby achieve a higher field with the solenoid than would be possible using only the alloy of high zirconium content despite the fact that individually, that high zirconium content wire may have an inherently larger critical field. Moreover, by varying the diameter of wire used in various sections, further control of the current density in each section can be achieved.

Ideally in using the principles of this invention, each layer or coil of wire would be made of the wire composition having the best characteristics for the particular field to which it would be subjected. For example, a solenoid of say 20 layers would be made from 20 different compositions since the field in the coil would vary continuously from its center to its outer surface. As a practical matter, that is not particularly feasible in view of economic considerations. Consequently, a comprise is made for economic reasons, and generally at least two and preferably about three to six or more sections made of different compositions will be used. For example, in many solenoids made to date in accordance with this invention, three sections have been used while in others, six sections have been used with two different wire diameters and two different wire compositions., Further, about 5 to 15 layers of windings is a practical minimum number for any given section and normally such a number would be used for small or central sections and up to 100 or more for large sections. Of course, design considerations will largely determine those limitations.

The economies attainable by the principles of the invention can be achieved with any wire composition evidencing superconductive properties that vary with composition, and the invention is not restricted to the niobium-zicronium system by which it is exemplified. The variation in superconductive properties as a function of composition is known for presently used compositions and is routinely determined for newly developed compositions by the simple test of placing the wire in a suitable cryogenic fluid, e.g. liquid helium, and noting its magnetic and current carrying characteristics. Typical systems that are included are niobium-tin, niobium-hafnium, vanadium-titanium, vanadium-zirconium, vandium-hafnium, tantalum-titanium, tantalum-zirconium, and tantalum-hafnium alloys as well as such compounds as $Nb_3Sn$, $V_3Ge$, $V_3Si$ and $Nb_3Al$ as well as mixtures of compounds and alloys.

The magnetic field distribution radially in a superconducting solenoid can be approximately determined for any given solenoid of fixed dimensions. Then the coil can be reconstructed with wire windings as in this invention, and the new field distribution determined. A second reconstruction based on the new field distribution will be a more optimal product than the first. This can be repeated as desired to prepare the best solenoid. As a practical matter, one generally stops where expected improvement outweighs the trouble and expense of further testing and rewinding.

Figure 1:
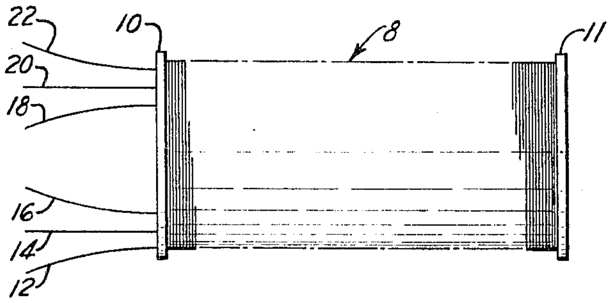
FIG. 1 shows a side view of a solenoid of the invention.
Figure 3:
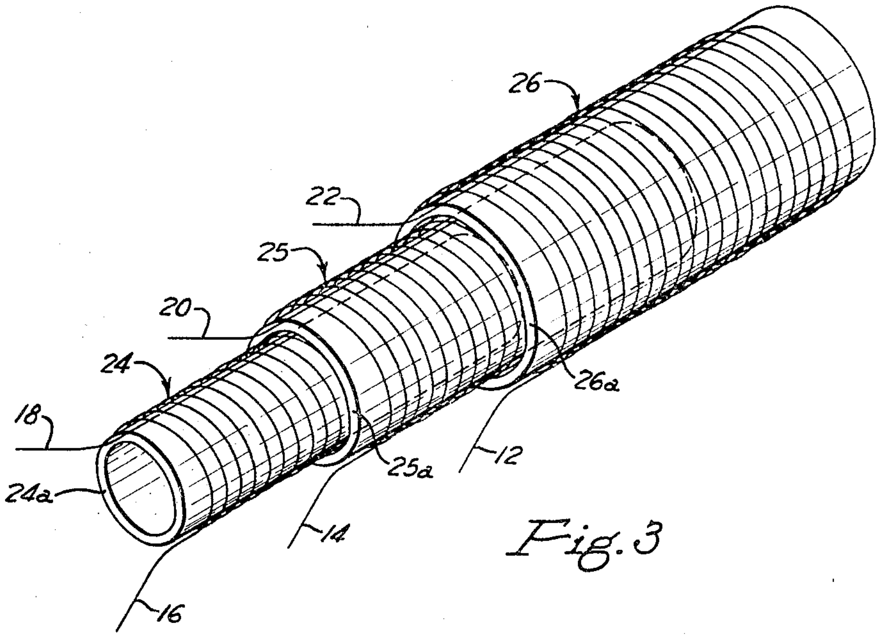
FIG. 3 is a partially exploded view of the wire sections of the solenoid of FIG. 1.

A typical solenoid prepared in accordance with the principles of the invention is shown, diagrammatically, in the drawing. The solenoid 8 in FIG. 1 is a hollow cylindrical member having end plates 10 and 11 and has six leads 12, 14, 16, 18, 20 and 22 extending through end plate 10. As is evident in the exploded view of FIG. 2, the solenoid 8 is composed of three sections 24, 25 and 26. The central or axial section 24, for this particular embodiment, is wound on its former **24*a* with a wire having, by way of example, a composition of, by weight, 50 percent zirconium and 50 percent niobium and terminates in leads 16 and 18. It constitutes, along a radial line, about 22 percent of the wire used in one particular embodiment. Former 24*a* is hollow so that, in operation, the cryogenic fluid can be admitted thereto. Intermediate section 25 is wound on former 25*a* with a wire having a composition of, by weight, 33 percent zirconium and the remainder niobium and terminates in leads 14 and 20. Section 25 is of about the same size as section 24, that is about 22 percent (radially) of the wire used in the solenoid in this particular embodiment. The remainder. about 56 percent, of the solenoid wire is in the third section 26 which is wound on former 26***a* and is composed, by weight, of 25 percent zirconium and the remainder niobium and terminates in leads 12 and 22.

The wire used in each of sections 24, 25 and 26 usually will be about 1 to 20 or more mils in diameter, for example 10 mils. If desired, the diameter used may be varied from section to section, preferably with smaller diameter wire used for outer windings, to attain the desired current density variation while using one current supply to drive the coil. It is to be noted that superconductivity in the niobium-zirconium alloy system is evidenced in compositions of about 15 to 60 or more weight percent zirconium and the remainder niobium. The wires mentioned above, namely, the 50 percent zirconium, 33 percent zirconium and 25 percent zirconium systems, are given merely for illustration and different compositions can be used as well, as noted hereinbefore.

It will be appreciated by those skilled in the art that the formers 24*a*, 25*a* and 26*a* and end plates 10 and 11 may be formed of any strong, non-superconducting material that can withstand the conditions and materials used at cryogenic conditions; preferably the former material has a thermal expansion characteristic similar to a coil of the wire used. Stainless steel is a satisfactory material for these portions of the solenoid, but other materials can be used if desired. It is to be noted that formers, other than a central or axial one, are not essential in constructing these solenoids. They are, however, desirable for convenience of construction and for the reason that they permit spacing the sections of wire to permit the cryogenic fluid to flow therein and thereby contribute better heat transfer characteristics to the resulting structure. In operation, the solenoid can be immersed in the cryogenic fluid, and the latter may be caused to flow through and around the solenoid, if desired, as well as through its core area. The end plates 10 and 11 may be slotted along their faces to facilitate flow.

Figure 4:
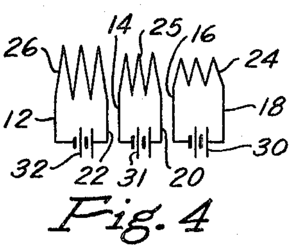
FIG. 4 is a circuit diagram of the solenoid of FIGS. 1 to 3 showing independent sources of current for the coils.

In use of a solenoid as just described, the various sections are separately supplied with current independent of the currents in the other sections. Thus, larger currents are supplied to the lower field sections (sections 25 and 26 in FIG. 2), without causing premature criticality in the central high field winding. The circuit diagram of FIG. 4 shows coil sections 24, 25 and 26 with their respective current supplies 30, 31 and 32.

Solenoids have been prepared in accordance with the principles of this invention. With one particular solenoid, a field of 68 kilogauss was obtained. The physical characteristics of that solenoid were: The solenoid was made with six sections using 7.5 mil wire for the first three sections and 10 mil wire for the remaining sections. The wire for all sections was of niobium-zirconium, with that for sections 1 and 2 containing 33 percent of zirconium while the other four sections were of wire containing 25 percent of zirconium, the remainder being niobium in each instance. A central cylinder 2 inches in length was used having an outside diameter of 0.150 inch, and 360 feet of the wire was wound thereon in a total of 18 layers resulting in an outside diameter, for the first section, of 0.46 inch. In the second section, 2000 feet of the wire were wound in 30 layers resulting in an outside diameter for section 2 of 1.16 inches. Then 3800 feet of the wire were wound into 39 layers for the third section which had an outside diameter of 1.86 inches. Section 4, which was made with 10 mil diameter wire, was formed with 2500 feet of the wire in 24 layers and had an outside diameter of 2.46 inches. In section 5 there were 4000 feet of the wire in 22 layers and it had an outside diameter of 3.0 inches. The final section was made 6000 feet of the wire in 33 layers and the resulting outside diameter was 3.8 inches. The current in each section was supplied separately and was: section 1, 8 amps.; section 2, 8.5 amps.; section 3, 10.1 amps.; section 4, 12.9 amps.; section 5, 12 amps.; and section 6, 10.0 amps. As already noted the field achieved with this solenoid was 68 kilogauss.

From the foregoing discussion and description, it is evident that this invention provides markedly improved solenoids for cryogenic applications. These unique results have been achieved without departing from conventional construction techniques, and thus without suffering a collateral detriment while securing the indicated advantages.

In accordance with the requirements of the patent statutes, the present invention has been described and exemplified with what is now believed to be its best embodiment. It should be understood that changes, substitutions and the like can be made without departing from its scope.

We claim:

1. A solenoid for cryogenic applications comprising a generally cylindrical member composed of a material free from superconducting properties, a plurality of layers of turns of wire wound on said cylindrical member, the wire being of niobium-base alloy compositions that have superconducting properties, a first axial group of said layers of wire having a first critical field-current density super-conductivity characteristic and a second group of layers of the wire about said first group and having a higher niobium content and a higher critical current density than said first group of layers at the magnetic field of operation, each of said group of layers connected to an independent source of current.

2. A solenoid for cryogenic applications comprising a generally cylindrical member composed of a material free from superconducting properties and a plurality of layers of windings of wire thereon, the wire being formed of a superconducting niobium-zirconium alloy, a first axial group of said layers of wire adjacent the surface of the cylindrical member having a higher zirconium content than the wire in the surrounding groups of layers in the solenoid.

3. A solenoid in accordance with claim 2 in which each group of layers of wire is connected to a current supply independent of current supplied to other groups of layers in the solenoid.

4. A solenoid according to claim 2, the wire in the group of layers adjacent the surface of the cylindrical member having a zirconium content about 33 weight percent.

5. A solenoid for cryogenic applications comprising a generally cylindrical member composed of a material free from superconducting properties and a plurality of layers of windings of wire thereon, the wire being of niobium-base alloy compositions that have superconducting properties, a first axial group of said layers of wire having a first critical field current density superconductivity characteristic and a second group of layers of the wire about said first group and having a higher niobium content and a higher critical current density than said first group of layers at the magnetic field of operation, the diameter of said wire in said second group of layers being smaller than that of the first group of layers, and the entire solenoid being arranged for current supply from a single source.

6. A solenoid for cryogenic applications comprising a generally cylindrical member composed of a material free from superconductive properties and a plurality of layers of windings of wire thereon, the wire being a niobium-zirconium alloy composition that has superconducting properties, a first axial group of said layers of wire having a first critical field current density superconductivity characteristic and a second group of layers of the wire about said first group having a higher niobium content and a higher critical current density than said first group of layers at the magnetic field of operation, the diameter of said wire in said second group of layers being smaller than that of the first group of layers, and the entire solenoid being arranged for current supply from a single source.

7. A solenoid for cryogenic applications comprising a first cylindrical member, a length of niobium-base alloy wire having superconducting properties wound on the first cylindrical member, a second cylindrical member slip-fitted about the winding over the first cylindrical member, and a length of niobium-base alloy wire having superconducting properties wound on the second cylindrical member, the wire on said first cylindrical member having a lower niobium content and a higher critical field characteristic than the wire on the second cylindrical member, the cylindrical members being formed of material free from superconducting properties and each of said lengths of wire connected to an independent source of current.

8. A solenoid for cryogenic applications comprising a first cylindrical member, a length of niobium-zirconium base alloy wire having superconducting properties wound on the first cylindrical member, a second cylindrical member slip-fitted about the winding over the first cylindrical member, and a length of niobium-zirconium base alloy wire having superconducting properties wound on the second cylindrical member, the wire on said first cylindrical member having a lower niobium content and a higher critical field characteristic than the wire on the second cylindrical member, the cylindrical members being formed of material free from superconducting properties and each of said lengths of wire connected to an independent source of current.

References Cited by the Examiner

UNITED STATES PATENTS

| | | |
|---|---|---|
| 3,129,359 | 4/1964 | Kunzler. |
| 3,185,900 | 5/1965 | Jaccarino et al. |

OTHER REFERENCES

High Magnetic Fields, The MIT Press and John Wiley & Sons, Inc. New York, 1962, QC 760 16 1961, pp. 325–326.

International Science & Technology, May 1963, pages 50–57, QI 165.

Metallurgy of Advanced Electronic Materials, vol 19, Interscience Publishers, 1963, pages 35–48, TK 7801 C6.

BERNARD A. GILHEANY, *Primary Examiner.*

JOHN F. BURNS, *Examiner.*

G. HARRIS, Jr., *Assistant Examiner.*